Aug. 7, 1928.　　　　　　　　　　　　　　　　　　1,679,774
C. W. LARNER
VALVE
Filed July 24, 1923　　　3 Sheets-Sheet 1

WITNESS:

INVENTOR
Chester W. Larner
BY
Augustus B. Stoughton
ATTORNEY.

Aug. 7, 1928.

C. W. LARNER 1,679,774

VALVE

Filed July 24, 1923  3 Sheets-Sheet 2

WITNESS:

INVENTOR
Chester W. Larner
BY
Augustus B. Stoughton
ATTORNEY.

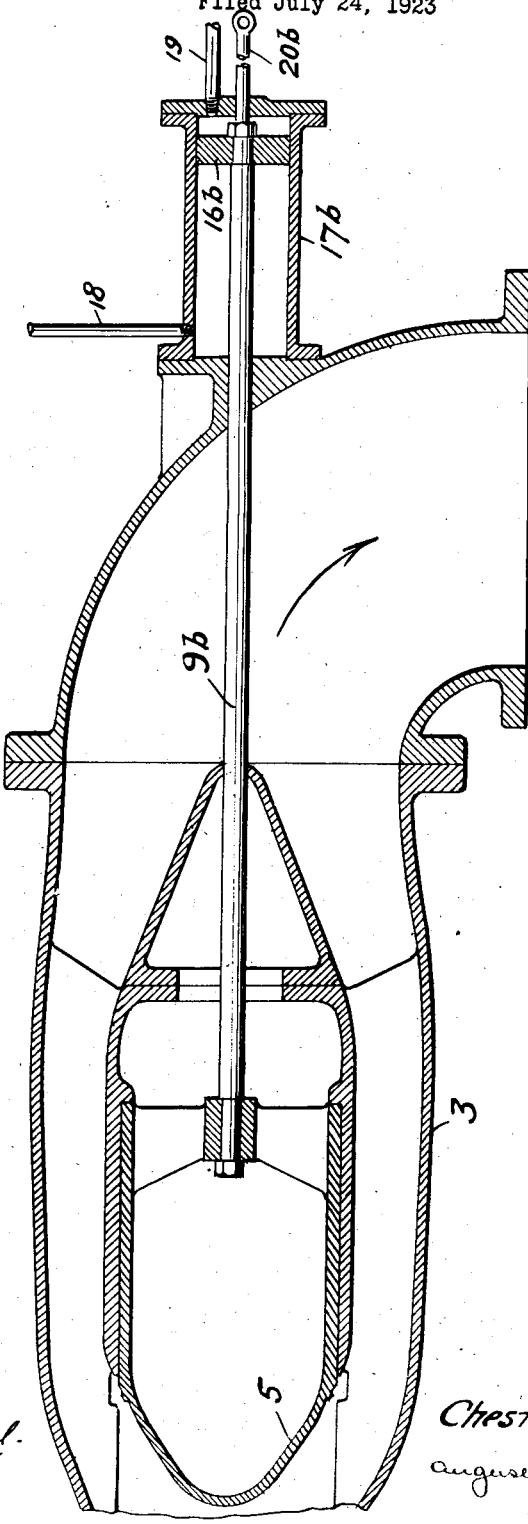

Patented Aug. 7, 1928.

1,679,774

UNITED STATES PATENT OFFICE.

CHESTER W. LARNER, OF PHILADELPHIA, PENNSYLVANIA.

VALVE.

Application filed July 24, 1923. Serial No. 653,428.

One object of the present invention is to provide a relatively simple and economical valve structure suitable for use in any ordinary pipe line but particularly adapted for application to and use with a Venturi tube customarily employed for the measurement of the quantity of flow. Another object of the invention is to obviate the use of packing on the valve plunger. Other objects of the invention will appear from the following description at the end of which the invention will be claimed.

In the following description reference will be made to the accompanying drawings forming part hereof and in which Figure 1 is a longitudinal sectional view of a valve embodying features of the invention.

Figs. 3 and 4 are longitudinal sectional views illustrating modifications.

Figure 1:
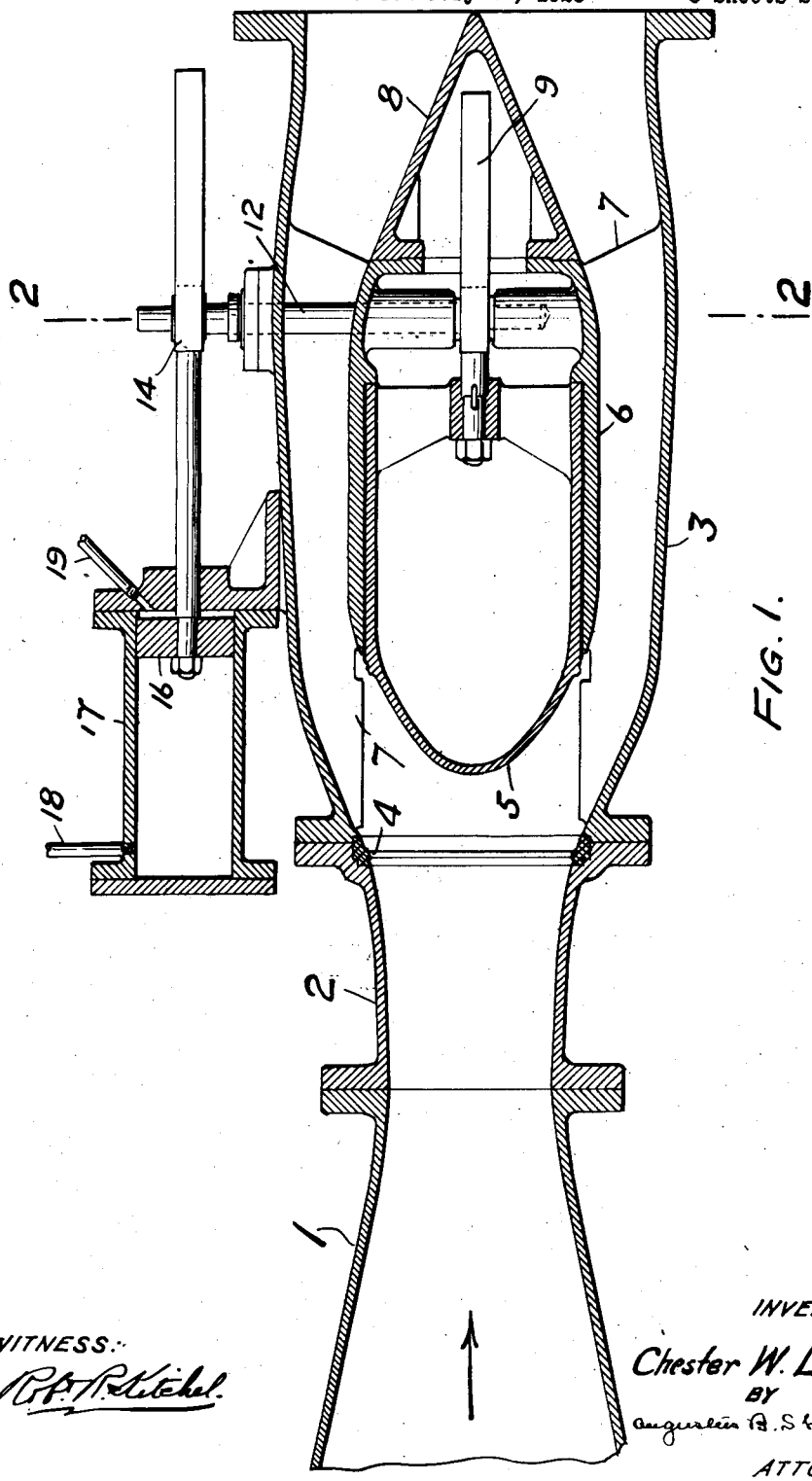

Referring to Fig. 1, 1 is the contracting portion of the Venturi tube, 2 the throat and 3 the valve body which in this arrangement constitutes the expanding leg of the Venturi tube; 4 is the valve seat and 5 the movable plunger which seats against 4 to shut off the flow. The plunger 5 slides in a guide having the form of a stationary cylinder 6 held in the body 3 by radial ribs 7. The downstream end of the cylinder 6 is closed by a cone shaped cover 8.

Figure 2:
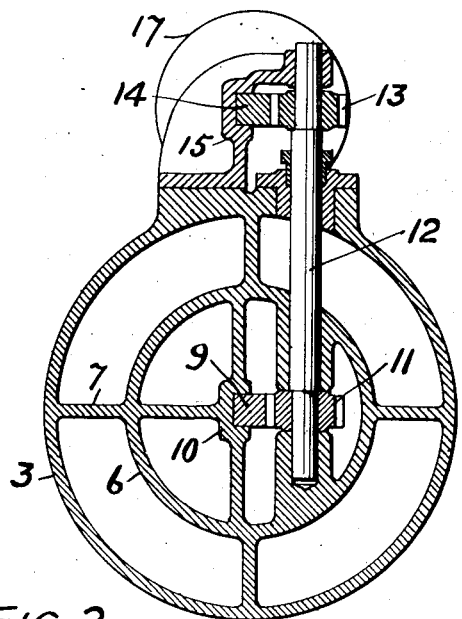
Fig. 2 is a sectional view taken on the line 2—2 of Figure 1.

Plunger 5 is connected to a rack 9 which slides in a guide 10 shown in Fig. 2. The rack 9 meshes with a pinion 11 on a shaft 12 passing through the internal cylinder 6 and the body 3 and having another pinion 13 mounted externally. The pinion 13 meshes with a rack 14 sliding in a guide 15. The rack 14 is attached to a piston 16 in a cylinder 17 mounted on the outside of the valve body. The cylinder 17 has pipe connections 18 and 19 which are used to admit or exhaust pressure from one end or the other of cylinder 17, thus operating piston 16 which in turn operates plunger 5 through the gearing already referred to.

Pressure from the pipe line may be utilized in cylinder 17 or pressure from any other convenient source of supply. If the pressure of the pipe line is to be used, cylinder 17 must be larger than plunger 5, in order to hold the plunger closed against the pressure of the pipe line. If however, pressure higher than the pipe line is available from some other source, the cylinder may be made smaller than plunger 5, as shown in Fig. 1.

Figure 3:
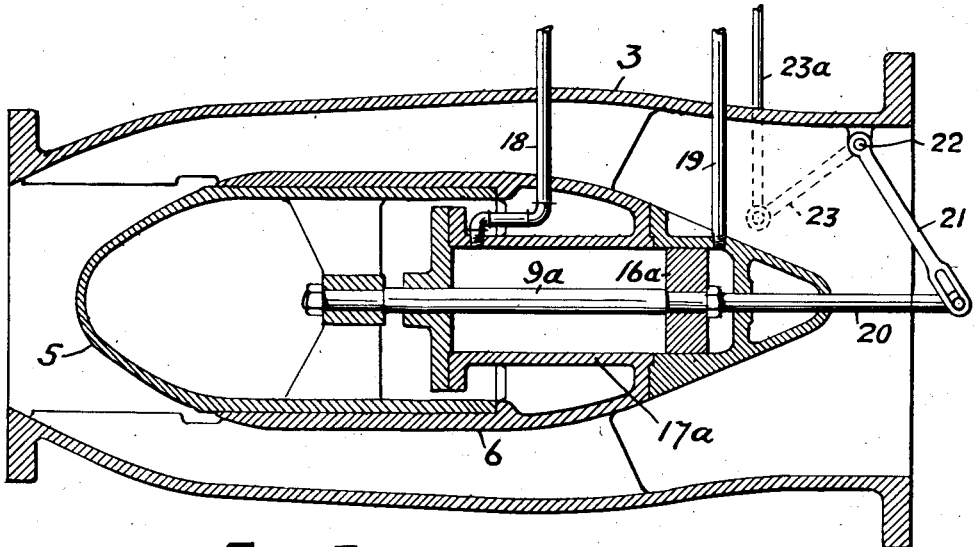

The construction and arrangement shown in Fig. 3 are the same as has been described in connection with Figure 1, except that the gearing is dispensed with and cyl'nder 17$^a$ is placed inside of cylinder 6 and connected directly to plunger 5 by piston rod 9$^a$. Piston 16$^a$ is provided in this arrangement with a tail rod 20 operating a lever 21 connected to a rocker shaft 22 which passes through body 3 and has an arm 23 on the outside for connection as by rod 23$^a$ to some suitable form of indicator to show the position of plunger 5.

Fig. 4 shows another arrangement in which an elbow is placed downstream from the valve and cylinder 17$^b$ is mounted on the outside of the elbow. In this case, the piston 16$^b$ is connected directly to plunger 5 by piston rod 9$^b$. A tail rod 20$^b$ is provided for connection to a position indicator of any suitable design.

The particular adaptability of this valve to use in combination with a Venturi tube lies in the fact that all of the internal parts and valve mechanism are situated downstream from the throat of the tube and at the same time the valve seat is adjacent to the throat of the tube. The throat of the tube being the region of minimum cross section, it naturally follows that the valve and parts associated with it are reduced to minimum size and minimum cost but at the same time the proximity of the valve to the throat of the Venturi tube does not interfere with the accuracy of water measurements, because the valve is located on the downstream side in the expanding leg of the Venturi tube or meter. With this arrangement, the valve may be operated at any opening, controlling the flow of water through the tube, but at the same time not interfering with the accuracy of the measurements, and this would not be the case if the valve were located upstream from the valve throat but adjacent thereto. In that case the valve would be in the contracting leg of the tube and would destroy the accuracy of any measurements of flow which might be made.

The objective may be said to be to get a valve which can be used in combination with a Venturi meter without destroying the accuracy of the latter and which will be as small and economical as possible. The valve is put downstream from the throat of the meter in order not to interfere with the functioning of the meter and at the same time, in order to keep the valve as small as possible, it should seat at or near the throat of the meter, which is the region of minimum cross section.

It will be obvious to those skilled in the art to which the invention relates that modifications may be made in details of construction and arrangement without departing from the spirit of the invention which is not limited to such matters or otherwise than as the prior art and the appended claims may require.

I claim:

1. A valve including in combination a Venturi tube, a plunger located in and confined to the expanding leg of the tube and pointing upstream, there being space provided between the throat of the tube and the nose of the plunger in all positions thereof to afford undisturbed flow in the throat, and means for seating and unseating the plunger.

2. A valve including in combination a Venturi tube, a plunger pointing upstream and arranged in and confined to the expanding part of the tube and in all positions spaced from the region of minimum cross-section of the tube, there being space provided between the throat of the tube and the nose of the plunger in all positions thereof to afford undisturbed flow in the throat, and means for operating the plunger.

3. A valve including in combination a tubular body and a contracted throat said body having a waterway of increasing cross-section on the downstream side of the throat, a valve seat adjacent to and spaced downstream from the region of minimum cross-section of the throat, an imperforate plunger arranged in the waterway and at all times and in all positions internally subjected to the pressure of the waterway and pointing upstream and adapted to co-operate with the seat, there being space provided between the throat and nose of the plunger in all positions thereof to afford undisturbed flow in the throat, and means for operating the plunger.

4. A valve including in combination a waterway of increasing cross-section, a restricted throat, an imperforate plunger confined to and arranged in the expanded waterway and at all times and in all positions internally subjected to the pressure of the waterway and pointing upstream, there being space provided between the throat and nose of the plunger in all positions thereof to afford undisturbed flow in the throat, and piston and cylinder means for operating the plunger.

5. A valve including in combination a valve body having a water-way and a seat, an imperforate plunger pointing upstream and arranged in the water-way and at all times and in all positions internally subjected to the pressure of the water-way, there being space provided between the throat of the water-way and the nose of the plunger in all positions thereof to afford undisturbed flow in the throat of the water-way, and piston and cylinder means for operating the plunger.

6. A valve including in combination a body having a water-way and a throat, an imperforate plunger pointing upstream and arranged in the water-way and spaced from the point of minimum cross section of the throat and at all times and in all positions internally subjected to the pressure of the water-way, there being space provided between the throat and the nose of the plunger in all positions thereof to afford undisturbed flow in the throat, and piston and cylinder means for operating the plunger in two directions.

CHESTER W. LARNER.